United States Patent
Drescher

(10) Patent No.: US 10,883,854 B2
(45) Date of Patent: Jan. 5, 2021

(54) CAMSHAFT SENSOR WHEEL

(71) Applicant: Robert Bosch GmbH, Stuttgart (DE)

(72) Inventor: Ralf Drescher, Korntal-Muenchingen (DE)

(73) Assignee: Robert Bosch GmbH, Stuttgart (DE)

( * ) Notice: Subject to any disclaimer, the term of this patent is extended or adjusted under 35 U.S.C. 154(b) by 295 days.

(21) Appl. No.: 15/774,320

(22) PCT Filed: Oct. 24, 2016

(86) PCT No.: PCT/EP2016/075533
§ 371 (c)(1),
(2) Date: May 8, 2018

(87) PCT Pub. No.: WO2017/102147
PCT Pub. Date: Jun. 22, 2017

(65) Prior Publication Data
US 2020/0256704 A1   Aug. 13, 2020

(30) Foreign Application Priority Data

Dec. 17, 2015   (DE) .................. 10 2015 225 556

(51) Int. Cl.
*G01D 5/14* (2006.01)
*G01D 5/245* (2006.01)
(Continued)

(52) U.S. Cl.
CPC ............. *G01D 5/145* (2013.01); *G01D 5/147* (2013.01); *G01D 5/2451* (2013.01); *G01D 11/245* (2013.01); *G01P 3/487* (2013.01)

(58) Field of Classification Search
CPC .... G01D 5/145; G01D 11/245; G01D 5/2451; G01D 5/00; G01P 3/487
(Continued)

(56) References Cited

U.S. PATENT DOCUMENTS 5,070,727 A * 12/1991 Davis .................... F02P 3/0456
                                                        73/114.26
6,073,713 A *  6/2000 Brandenburg .......... F02N 11/04
                                                        180/65.22
(Continued)

FOREIGN PATENT DOCUMENTS

DE       102012021337 B3     8/2013
EP            2453125 A1     5/2012
(Continued)

OTHER PUBLICATIONS

International Search Report dated Jan. 16, 2017, of the corresponding International Application PCT/EP2016/075533 filed Oct. 24, 2016.

*Primary Examiner* — Clayton E. LaBalle
*Assistant Examiner* — Kevin C Butler
(74) *Attorney, Agent, or Firm* — Norton Rose Fulbright US LLP; Gerard Messina

(57) ABSTRACT

A sensor wheel for detecting the rotational position of a camshaft, elevations and depressions being developed along the circumference of the sensor wheel, which respectively form a segment, which may be detected by a sensor sensitive to magnetic fields when the sensor wheel is in motion, the sensor wheel comprising a long elevation, a medium length elevation and a short elevation as well as a long depression, a medium length depression and a short depression, the long elevation being as long as the long depression, the medium length elevation being as long as the medium length depression, the short elevation being as long as the short depression. The ratio of the length of the long elevation to the length of the medium length elevation is the same as the ratio of the length of the medium length elevation to the length of the short elevation.

5 Claims, 1 Drawing Sheet

(51) Int. Cl.
*G01P 3/487* (2006.01)
*G01D 11/24* (2006.01)

(58) Field of Classification Search
USPC .................................................. 324/207.25
See application file for complete search history.

(56) References Cited

U.S. PATENT DOCUMENTS

| | | | | |
|---|---|---|---|---|
| 7,104,119 | B1* | 9/2006 | Trapasso | G01D 5/2451 |
| | | | | 73/114.26 |
| 8,548,716 | B2* | 10/2013 | Wang | F01L 1/344 |
| | | | | 123/406.63 |
| 8,682,564 | B2* | 3/2014 | Gauthier | G01M 15/06 |
| | | | | 123/90.11 |
| 9,765,711 | B2* | 9/2017 | Martinson | F02D 37/02 |
| 9,933,448 | B1* | 4/2018 | Binder | G01P 3/487 |
| 2002/0118012 | A1* | 8/2002 | Gudgeon | G01P 3/488 |
| | | | | 324/207.15 |
| 2003/0141862 | A1* | 7/2003 | Vig | G01D 5/24457 |
| | | | | 324/174 |
| 2004/0017190 | A1* | 1/2004 | McDearmon | G01D 5/145 |
| | | | | 324/207.25 |
| 2008/0136404 | A1* | 6/2008 | Gauthier | F01L 1/3442 |
| | | | | 324/207.2 |
| 2009/0001965 | A1* | 1/2009 | Ausserlechner | G01P 21/02 |
| | | | | 324/202 |
| 2009/0326860 | A1* | 12/2009 | Hainz | G01D 5/24485 |
| | | | | 702/163 |
| 2014/0195186 | A1* | 7/2014 | Carbonne | G01R 33/093 |
| | | | | 702/94 |
| 2015/0020581 | A1* | 1/2015 | Stuckert | G01D 5/147 |
| | | | | 73/114.27 |
| 2016/0041006 | A1* | 2/2016 | Ausserlechner | G01R 33/077 |
| | | | | 324/207.2 |
| 2016/0356628 | A1* | 12/2016 | Foletto | G01R 33/072 |
| 2017/0322233 | A1* | 11/2017 | Grambichler | G01P 13/045 |
| 2018/0259365 | A1* | 9/2018 | Mirassou | G01D 5/145 |
| 2018/0313288 | A1* | 11/2018 | Mazenc | F02P 7/0675 |
| 2018/0335441 | A1* | 11/2018 | Hammerschmidt | G01D 5/12 |
| 2018/0356256 | A1* | 12/2018 | Mirassou | G01D 5/2448 |
| 2020/0103250 | A1* | 4/2020 | Yashan | G01P 3/487 |

FOREIGN PATENT DOCUMENTS

| | | |
|---|---|---|
| JP | S5438508 A | 3/1979 |
| JP | 2000240489 A | 9/2000 |
| JP | 2011157835 A | 8/2011 |
| JP | 2014182040 A | 9/2014 |
| JP | 2015214952 A | 12/2015 |

* cited by examiner

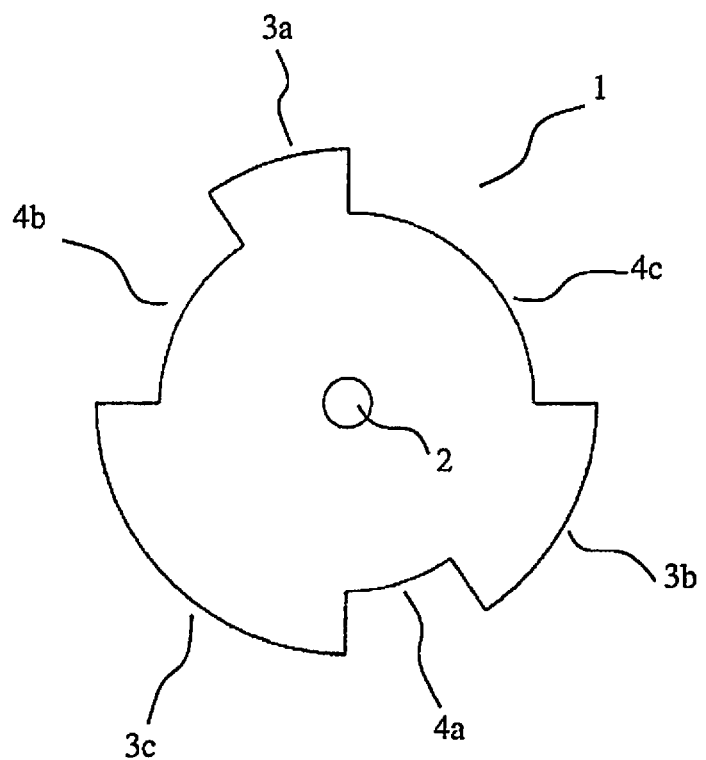

CAMSHAFT SENSOR WHEEL

BACKGROUND INFORMATION

A sensor wheel is a disk that is connectable to a rotating shaft in a torsionally fixed manner. A sensor wheel has different regions along its circumference which on account of different physical properties produce different sensor signals when moving past a stationary sensor. A common implementation of a sensor wheel is a toothed wheel which has along its circumference various segments, individual segments being characterized in that they represent either elevations or depressions relative to an imaginary mean radius. If such a sensor wheel is moved past a Hall sensor or an inductive sensor, in the proximity of which there is a magnet, then the sensor is able to register magnetic field changes produced by the elevations and depressions and is thus able to provide information regarding the rotational position of the sensor wheel and, respectively, of a shaft connected to the sensor wheel. Such sensor wheels are used for example to indicate the rotational position of a camshaft in an internal combustion engine. Sensor wheels used in this type of application are called camshaft sensor wheels.

There are currently two dominant designs of camshaft sensor wheels on the market. A first design has 140-40 degree segments relative to the crankshaft, i.e., the circumference of the sensor wheel is formed alternately by four elevations and four depressions, the elevations comprising 140 degrees and the depressions comprising 40 degrees relative to the crankshaft. The length of the elevations and depressions may alternatively also be reversed.

A second design on the market has 180-128-52 degree segments. That is to say, it comprises an elevation of 180 degrees in length, followed by a depression of 128 degrees in length, followed by an elevation of 52 degrees in length, followed by a depression of 180 degrees in length, followed by an elevation of 128 degrees in length, followed by a depression of 52 degrees in length. The depression of a length of 52 degrees is followed directly by the initially mentioned elevation of 180 degrees in length.

All specifications of length here refer to the crankshaft so that the sum of the segment lengths of a camshaft sensor wheel corresponds to 720 degrees.

The camshaft sensor wheel with 140-40 degree segments is optimized for use in systems with camshaft adjustment, which is why the signal ratio is maximized for detecting long and short segments. This result in a maximum adjustment range of the camshaft of 100 crankshaft degrees, which in practice, however, is limited to approx. 80 degrees, due to tolerances.

The camshaft sensor wheel with 180-128-52 degree segments is optimized for fast phase determination, but is not provided for use in systems having camshaft adjustment. Although this theoretically yields an adjustment range of 180 crankshaft degrees for the camshaft, this design is sensitive with respect to errors so that it is reliably usable only in slowly adjusted camshafts.

SUMMARY

An example sensor wheel according to the present invention may have the advantage that elevations and depressions are formed along its circumference, which in each case form a segment that is detectable by a sensor sensitive to magnetic fields when the sensor wheel is in motion. The sensor wheel according to the present invention comprises a long elevation, a medium length elevation and a short elevation as well as a long depression, a medium length depression and a short depression, the long elevation being as long as the long depression, the medium length elevation being as long as the medium length depression and the short elevation being as long as the short depression. The ratio of the length of the long elevation to the length of the medium length elevation is the same as the ratio of the length of the medium length elevation to the length of the short elevation.

The length of the long elevation and the length of the long depression are thus each 180 crankshaft degrees, which corresponds to 90 degrees with respect to a full circle. Within the usual manufacturing tolerances, this yields a length of approximately 90 degrees relative to a full circle.

The length of the medium length elevation and the length of the medium length depression are thus each 111.246 crankshaft degrees, which corresponds to 55.625 degrees with respect to a full circle. Within the usual manufacturing tolerances, this yields a length of about 56 degrees in relation to a full circle.

The length of the short elevation and the length of the short depression are thus each 68.754 crankshaft degrees, which corresponds to 34.377 degrees with respect to a full circle. Within the usual manufacturing tolerances, this yields a length of about 34 degrees in relation to a full circle.

In a preferred development, the elevations and depressions along the circumference of the sensor wheel are arranged in such a way that the long depression and the long elevation do not form two directly adjoining segments.

The medium length elevation and the medium length depression also do not form two directly adjoining segments. Likewise, the short elevation and the short depression also do not form two directly adjoining segments. Two directly adjoining segments are understood as two segments that are not spaced apart from each other by a third segment.

The sensor wheel of the present invention has the advantage of providing constant signal ratios between respectively two adjoining segments so that it is possible to detect the individual segments robustly and reliably.

An exemplary embodiment of the present invention is explained in more detail below with reference to the FIGURE.

BRIEF DESCRIPTION OF THE DRAWINGS

FIG. 1 shows a schematic representation of a sensor wheel according to the present invention.

DETAILED DESCRIPTION OF EXAMPLE EMBODIMENTS

FIG. 1 shows a schematic representation of a sensor wheel (1) that is connected to a camshaft (2) in a torsionally fixed manner. The circumference of the sensor wheel (1) has a short elevation (3a), which is followed—in the present example in the clockwise direction—by a long depression (4c). The long depression (4c) is followed by a medium length elevation (3b), which in turn is followed by a short depression (4a). The short depression (4a) is followed by a long elevation (3c), which in turn is followed by a medium length depression (4b). The medium length depression (4b) is again followed by a short elevation (3a). The elevations (3a, 3b, 3c) and the depressions (4a, 4b, 4c) respectively form a segment which produces a sensor signal characteristic for the segment when performing a turning motion in front of a camshaft sensor (not shown).

The length of the long elevation (3c) corresponds to the length of the long depression (4c). The length of the medium length elevation (3b) corresponds to the length of the medium length depression (4b). The length of the short elevation (3a) corresponds to the length of the short depression (4a).

The ratio of the length of the long elevation (3c) to the medium length elevation (3b) corresponds to the ratio of the length of the medium length elevation (3b) to the length of the short elevation (3a). Thus when using the sensor wheel of the present invention as a camshaft sensor wheel in an internal combustion engine signal ratio between respectively two adjoining segments (3a, 4c, 3b, 4a, 3c, 4b) is achieved.

The length of the long elevation (3c) is preferably about 180 crankshaft degrees, which corresponds to 90 degrees of a full circle. The length of the medium length elevation (3b) is preferably about 111 crankshaft degrees, which corresponds to 56 degrees of a full circle. The length of the short elevation (3a) is preferably about 69 crankshaft degrees, which corresponds to 34 degrees of a full circle.

In a particularly preferred embodiment the length of the long elevation (3c) is exactly 180 crankshaft degrees, the length of the medium length elevation is 111.246 crankshaft degrees and the length of the short elevation (3a) is 68.754 crankshaft degrees.

What is claimed is:

1. A sensor wheel for detecting the rotational position of a camshaft, elevations and depressions being developed along the circumference of the sensor wheel, which respectively form a segment, which may be detected by a sensor sensitive to magnetic fields when the sensor wheel is in motion, the sensor wheel comprising a long elevation, a medium length elevation, a short elevation, a long depression, a medium length depression, and a short depression, the long elevation being as long as the long depression, the medium length elevation being as long as the medium length depression, the short elevation being as long as the short depression, wherein a ratio of a length of the long elevation to a length of the medium length elevation is the same as a ratio of the length of the medium length elevation to a length of the short elevation;

wherein the length of the long elevation is greater than the length of the medium length elevation, and the length of the medium length elevation is greater than the length of the short elevation.

2. The sensor wheel as recited in claim 1, wherein the length of the long elevation is about 90 degrees of a full circle, the length of the medium length elevation is about 56 degrees of a full circle and the length of the short elevation is about 34 degrees of a full circle.

3. The sensor wheel as recited in claim 1, further comprising at least one additional segment being provided between the long elevation and the long depression.

4. The sensor wheel as recited in claim 1, wherein a length of the long depression is the same as the length of the long elevation, a length of the medium depression is the same as the length of the medium length elevation, and a length of the short depression is the same as the length of the short elevation.

5. The sensor wheel as recited in claim 4, wherein the long elevation does not directly adjoin the long depression, the medium length elevation does not directly adjoin the medium length depression, and the short elevation does not directly adjoin the short depression.

* * * * *